J. E. JOHNSON.
SPEEDOMETER.
APPLICATION FILED JAN. 8, 1917.

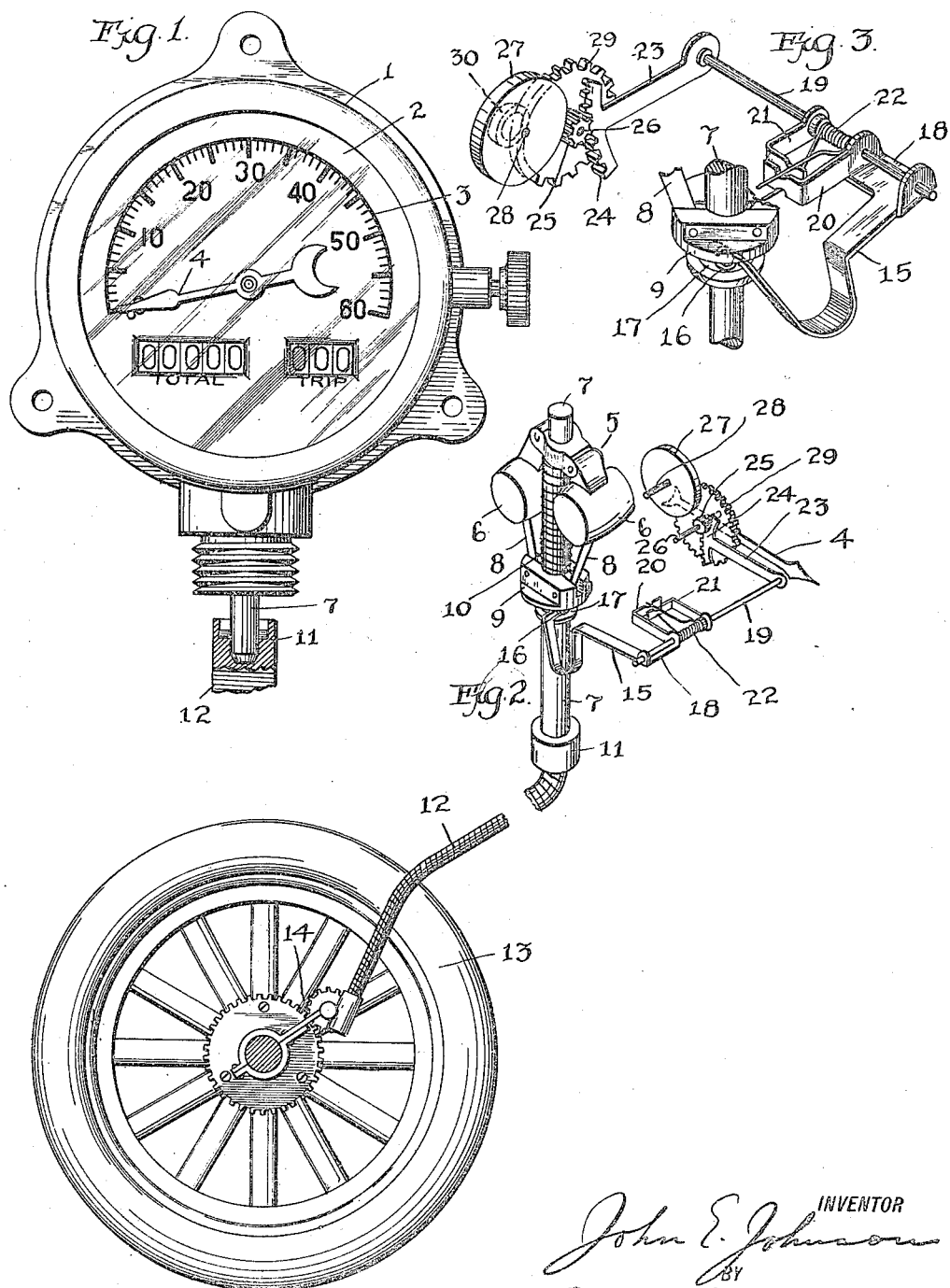

1,256,022.

Patented Feb. 12, 1918.
2 SHEETS—SHEET 2.

INVENTOR

UNITED STATES PATENT OFFICE.

JOHN E. JOHNSON, OF BROOKLYN, NEW YORK, ASSIGNOR TO CHARLES FISCHER, OF BROOKLYN, NEW YORK.

SPEEDOMETER.

1,256,022. Specification of Letters Patent. Patented Feb. 12, 1918.

Application filed January 8, 1917. Serial No. 141,158.

*To all whom it may concern:*

Be it known that I, JOHN E. JOHNSON, a citizen of the United States, residing at 360 East 19th street, borough of Brooklyn, county of Kings, city and State of New York, have invented certain new and useful Improvements in Speedometers, of which the following is a specification.

The invention relates to automobile speedometers of the type wherein an indicator is operated by a centrifugal governor, which is driven from one of the wheels of the vehicle, usually one of the front, steering wheels. Hitherto these devices have been to a certain extent unsatisfactory, owing to the fact that the pointer has been subject to confusing oscillations which made readings difficult and misleading. Such oscillations are due largely to the manner in which the governor is driven, that is to say from a wheel the revolution of which is momentarily checked by obstacles and which sometimes leaves the ground altogether, and through a flexible shaft, the position of which is constantly changing and which by reason of its nature does not transmit rotation throughout its length with absolute uniformity. These and other causes produce a dancing of the pointer, which is very objectionable. The purpose of this invention is to provide a means for compensating for the inherent defects of these systems, and to cause the pointer to register only actual speed changes and not mere adventitious operating conditions. This is accomplished by combining with the wheel and flexible shaft drive, a yielding spring connection between the governor and the indicator, and a resistance element connected with the indicator and requiring to be overcome through the spring.

In the accompanying drawings illustrating the invention:

Figure 1 is a face view of the speedometer, showing its connection with the flexible drive-shaft;

Fig. 2 is a perspective view illustrating the operative parts of the speedometer and the manner of driving the governor from a part of the vehicle running gear;

Fig. 3 is an enlarged fragmentary perspective view of parts within the speedometer casing;

Figure 4:
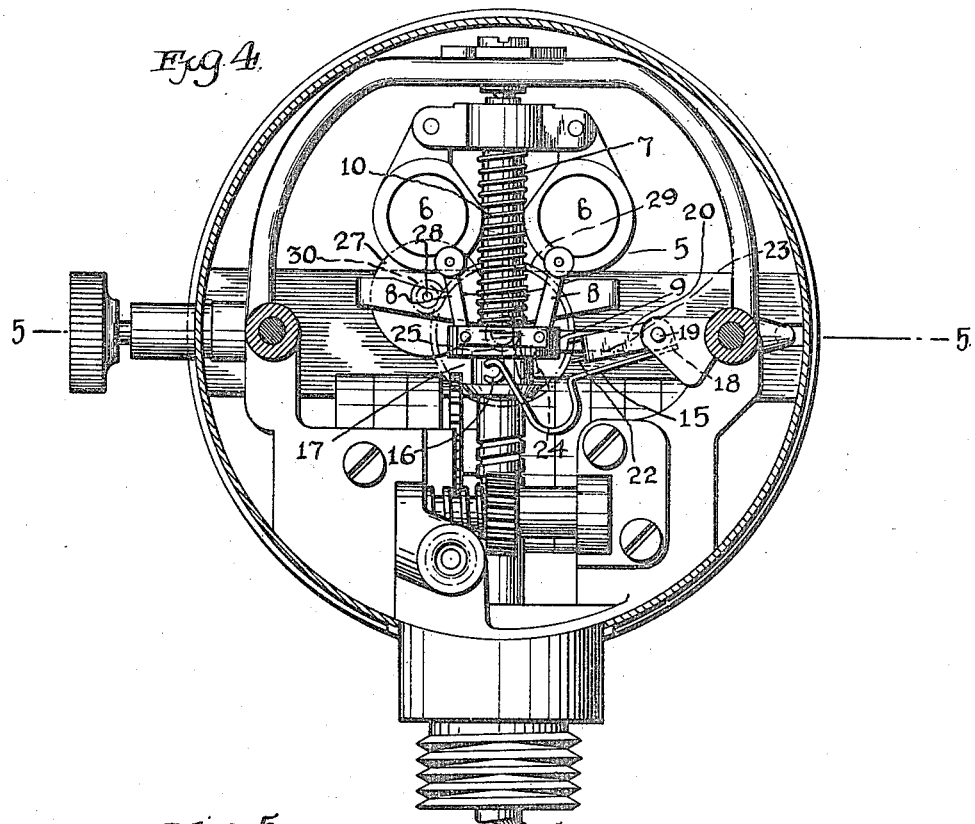
Fig. 4 is a vertical section through the speedometer casing on the line 4—4 of Fig. 5, showing parts within in elevation.
Figure 5:
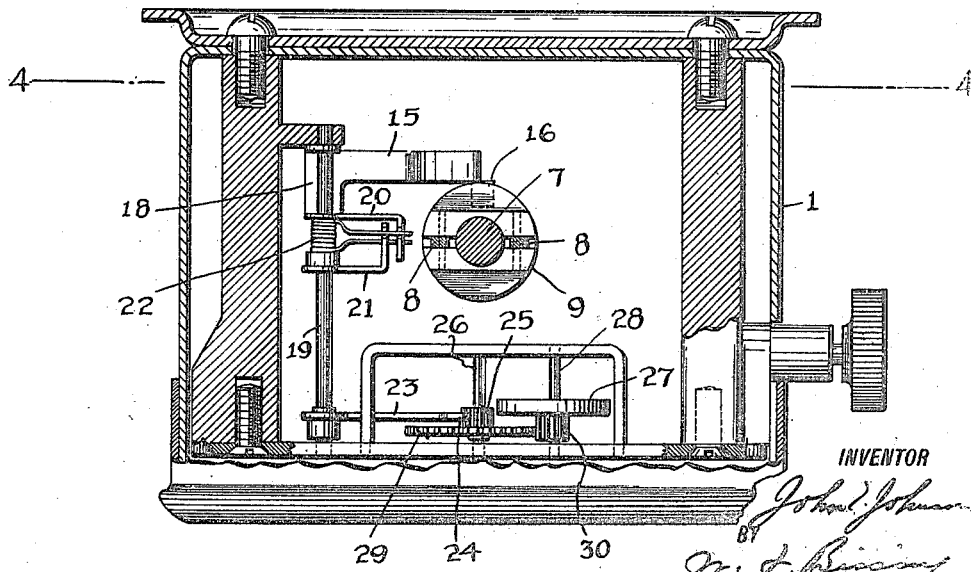
Fig. 5 is a horizontal section on the line 5—5 of Fig. 4.

The speedometer mechanism is housed in a suitable casing 1 having a window 2 covering the graduated dial 3 and the swinging pointer 4.

An ordinary fly-ball governor 5 is shown by way of illustration, its weight arms 6 being pivotally mounted on a vertical rotary shaft 7 and connected by links 8 with a sleeve 9 slidable on said shaft. The pull of the weight arms on the sleeve under the action of centrifugal force is opposed by the pressure of a compression spring 10, the two being adjusted as nearly as possible to produce equal amounts of rectilinear movement of the sleeve 9 for equal positive or negative increments of speed of the vehicle. The shaft 7 is connected at its lower end by a coupling 11 with the upper end of a flexible shaft 12, which is driven from one of the vehicle wheels 13 through customary gearing, as indicated at 14. The flexible shaft is led upward in a devious fashion, so as to avoid other mechanisms and to connect with the speedometer mounted on the dash, and must constantly change its position to accommodate itself to the steering movements of the wheel.

The slide 9 of the governor operates the indicator 4 through an arm 15 having a rounded end 16 lying in an annular channel 17 of the sleeve. This arm is shown as loosely mounted at 18 upon a rock-shaft 19 and is provided with a supplementary arm 20 overlapping or adjacent another arm 21 fast on the said shaft. The two arm members 20 and 21 are yieldingly connected by a spring 22 having its ends bearing against the said members and its intermediate portion coiled about the shaft 19. This shaft operates the pointer through a motion-multiplying gearing comprising an arm 23 fast on the shaft and bearing a curved rack or large gear segment 24 meshing with a small gear 25 fast on the pointer shaft 26. It will thus be seen that a yielding spring connection is interposed in the train at a point between the governor sleeve and the motion-multiplying gearing for operating the pointer. Furthermore, a resistance element is connected with the indicator the resistance of which requires to be overcome through the yielding connection. Such resistance element may take the form of an inertia disk 27 mounted upon a shaft 28 and the effect of which is increased by driving it from the indicator through a motion-multiplying or power-reducing gearing comprising a large gear 29 on the pointer shaft and a small gear 30 united with the disk.

In operation, all gradual or continued movements of the governor sleeve 9 in response to changes in vehicle speed are transmitted through the yielding connection to the pointer and inertia member, causing the pointer to assume the correct position upon the dial. In this connection it is to be understood that a relation exists between the strength of the spring connection 22 and the resistance of the member 27 (to which must be added the frictional and inertia resistance of the gearing), whereby such spring is effective to transmit motion of the character indicated, whereas any sudden movements caused by momentary changes in the revolution of the vehicle wheel, due to road inequalities, or by unevenness of action of the flexible shaft 12, or any unsteadiness in the operation of the governor itself, are absorbed by the spring 22 before they have time to alter the condition of motion or rest of the resistance means, so as to cause flickering of the pointer.

While I have described the preferred embodiment of mechanism of my speedometer in detail, it will be understood that numerous changes in form, proportion and arrangement are permissible.

What I claim as new is:

1. In a speedometer, the combination with a governor, of a rock-shaft and an indicator operated thereby, an arm pivoted coaxially with the rock-shaft and connected with the governor for operation thereby, a fixed arm on the rock-shaft, and a yielding connection between the arms comprising a spring coiled about the rock-shaft axis and having its ends embracing both arms.

2. In a speedometer, the combination with a governor, of a rock-shaft and an indicator operated thereby, an arm pivoted coaxially with the rock-shaft and operated by the governor, an arm fixed to the rock-shaft, said arms having reversely-extending overlapping portions, and a yielding connection spring coiled about the rock-shaft axis and having its ends embracing both said overlapping portions.

In testimony whereof, I have signed my name to this specification, in the presence of two subscribing witnesses.

JOHN E. JOHNSON.

Witnesses:
J. HOWARD BREESE,
LOUELLA F. LITTLE.

Copies of this patent may be obtained for five cents each, by addressing the "Commissioner of Patents, Washington, D. C."